(12) United States Patent
Kay et al.

(10) Patent No.: US 9,887,965 B2
(45) Date of Patent: Feb. 6, 2018

(54) METHOD AND SYSTEM FOR BROWSER IDENTITY

(75) Inventors: Erik Kay, Belmont, CA (US); Aaron S. Boodman, San Francisco, CA (US); Adam Barth, Stanford, CA (US)

(73) Assignee: GOOGLE LLC, Mountain View, CA (US)

( * ) Notice: Subject to any disclaimer, the term of this patent is extended or adjusted under 35 U.S.C. 154(b) by 88 days.

(21) Appl. No.: 13/554,492

(22) Filed: Jul. 20, 2012

(65) Prior Publication Data
US 2014/0025949 A1    Jan. 23, 2014

(51) Int. Cl.
| H04L 29/06 | (2006.01) |
| G06F 21/00 | (2013.01) |
| G06F 21/31 | (2013.01) |
| G06F 21/44 | (2013.01) |
| G06F 21/62 | (2013.01) |

(52) U.S. Cl.
CPC .......... *H04L 63/0428* (2013.01); *G06F 21/31* (2013.01); *G06F 21/44* (2013.01); *G06F 21/6245* (2013.01); *G06F 21/6254* (2013.01)

(58) Field of Classification Search
CPC ............ H04L 63/0428; G06F 21/6254; G06F 21/6245; G06F 21/31; G06F 21/44
USPC ......................................................... 713/168
See application file for complete search history.

(56) References Cited

U.S. PATENT DOCUMENTS

| 6,948,183 | B1* | 9/2005 | Peterka ........................... 725/25 |
| 2003/0131115 | A1* | 7/2003 | Mi et al. ........................ 709/229 |
| 2006/0075475 | A1* | 4/2006 | Boulos et al. .................... 726/6 |
| 2007/0078950 | A1* | 4/2007 | Hopkins et al. .............. 709/217 |
| 2008/0005238 | A1* | 1/2008 | Hall et al. ...................... 709/204 |
| 2010/0088519 | A1* | 4/2010 | Tsuruoka et al. ............. 713/176 |
| 2010/0262953 | A1* | 10/2010 | Barboni et al. ............... 717/120 |
| 2011/0289567 | A1* | 11/2011 | Bauer-Hermann et al. ...... 726/6 |
| 2013/0014126 | A1* | 1/2013 | Zana et al. ..................... 719/313 |
| 2013/0308621 | A1* | 11/2013 | Milburn et al. ............... 370/338 |
| 2014/0006622 | A1* | 1/2014 | Kaplinger et al. ............ 709/226 |

OTHER PUBLICATIONS

Jake Edge, "BrowserID: A new web authentication scheme", 2011, retrieved from <http://web.archive.org/web/20111114013030/http://lwn.net/Articles/453065/>, retrieved on Jan. 27, 2014.*
"Offline Web Applications, W3C Working Group Note", dated May 30, 2008, retrieved from <http://www.w3.org/TR/offline-webapps/>, retrieved on Jan. 27, 2014.*

(Continued)

*Primary Examiner* — Lisa Lewis
(74) *Attorney, Agent, or Firm* — Brake Hughes Bellermann LLP

(57) ABSTRACT

A browser application programming interface is exposed to a web application to verify an identify of a user using user-specific identity information stored by the browser. Cryptographic information associated with the user is transmitted from the browser application programming interface to the web application. User-specific content is provided to the user through the web application if the web application verifies an identify of the user via the browser application programming interface using the cryptographic information.

17 Claims, 8 Drawing Sheets

(56) References Cited

OTHER PUBLICATIONS

Yu Wang and Aanchal Gupta, "Browser Assisted Identity Management", May 24-25, 2011, Position Paper for W3C Workshop on Identity in the Browser, Retrieved Online <http://web.archive.org/web/20110525212656/http://www.w3.org/2011/identity-ws/papers/idbrowser2011_submission_15.pdf>, Retrieved on Jun. 30, 2014.*
Jeff Sayre and Henry Story, "The WebID Protocol & Browsers", May 24-25, 2011, Position Paper for W3C Workshop on Identity in the Browser, Retrieved Online <http://web.archive.org/web/20110525211551/http://www.w3.org/2011/identity-ws/papers/idbrowser2011_submission_22/webid.html>, Retrieved on Jun. 30, 2014.*
"Add OpenID to your site", OpenID Foundation, openid.net/add-openid/, Jun. 5, 2012, 2 pages.
"Introducing BrowserID: A Better Way to Sign in", Identity at Mozilla, identity.mozilla.com/post/7616727542/introducing-browserid-a-better-way-to-sign-in, Jun. 5, 2012, 3 pages.
Search Report and Written Opinion for International Application No. PCT/US2013/044012, dated Sep. 10, 2013, 13 pages.
Hammer-Lahav, "RFC5849—The OAuth 1.0 Protocol", retrieved from http://tools.ietf.org/pdf/rfc5849.pdf, Apr. 30, 2010, 38 pages.
Darcey, et al., "Android (TM)—Wireless Application Development", Aug. 24, 2011, pp. 94-95.
Whitson, "Understanding OAuth: What Happens When You Log Into a Site With Google, Twitter or Facebook", retrieved from http://lifehacker.com/5918086/understanding-oauth-what-happens-when-you-log-into-a-site-with-google-twitter-or-facebook, Jun. 13, 2012, 7 pages.
Hildenbrand, "Android 101: Using Multiple Android Devices", Dec. 8, 2011, 8 pages.
International Preliminary Report on Patentability for PCT Patent Application No. PCT/US2013/044012, dated Jan. 29, 2015, 10 pages.
Office Action for CN Application No. 201380045380.4, dated Nov. 2, 2016, 18 Pages.
Hildenbrand, "Android 101: Using multiple Android devices", retrieved from http://www.androidcentral.com/android-101-using-multiple-android-devices, Dec. 8, 2011, 3 pages.

* cited by examiner

```
{
    "name": "Google Mail",
    "description": "Read your gmail",
    "version": "1",
    "app": {
        "urls": [
            "*://mail.google.com/mail/",
            "*://www.google.com/mail/"
        ],
        "launch": {
            "web_url": "http://mail.google.com/mail/"
        }
    },
    "icons": {
        "128": "icon_128.png"
    },
    "permissions": [          — 302
        "unlimitedStorage"    — 304
        "notifications"       — 306
        "identity"            — 308
    ]
}
```

METHOD AND SYSTEM FOR BROWSER IDENTITY

TECHNICAL FIELD

This disclosure generally relates to web browser technology, and in particular, to an identity mechanism for a web browser.

BACKGROUND

A web browser may maintain an identity and authenticate the identity to a server. Yet, there is no system to provide a common identity across different web applications. Each time a user accesses a different web application, web service, or website, the user may have to login separately. It can prove very difficult for users to maintain different usernames and passwords, and to have to login so many times.

Further, current identity solutions may rely on server-to-server technology, without any help from the web browser. Current identity solutions may also be complex to implement and may result in a poor user experience. For example, current solutions may require relatively complex server-side code, and a confusing authentication user interface to get information like a user name, email, photo, or user-specific avatar. Further, cookie lifetimes are low, and logging out of a central account such as an email account might invalidate a session on other web applications, which may prove counter-intuitive for users. Accordingly, a need exists for systems and methods to address the shortfalls of present technology and to provide other new and innovative features.

SUMMARY

According to one general aspect, a browser application programming interface is exposed to a web application to verify an identity of a user using user-specific identity information stored by the browser. Cryptographic information associated with the user is transmitted from the browser application programming interface to the web application. User-specific content is provided to the user through the web application if the web application verifies an identity of the user via the browser application programming interface using the cryptographic information.

The details of one or more implementations are set forth in the accompanying drawings and the description below. Other features will be apparent from the description and drawings, and from the claims.

BRIEF DESCRIPTION OF THE DRAWINGS

FIG. 3 is an example of a manifest file related to a web application or extension.

Like reference symbols in the various drawings indicate like elements.

DETAILED DESCRIPTION

Systems and methods described here implement an identity related to a web browser, or a web browser that works as an operating system, for use by installed web applications. With user consent, a web browser may generate a unique cryptographic key pair for each (user, origin) pair. The public key may become the user's identity for the origin (i.e., web application). The key pairs may be synced between clients so that users do not need to enter new authentication credentials (beyond perhaps a browser login) each time they wish to use different web applications at different clients.

Figure 1A:
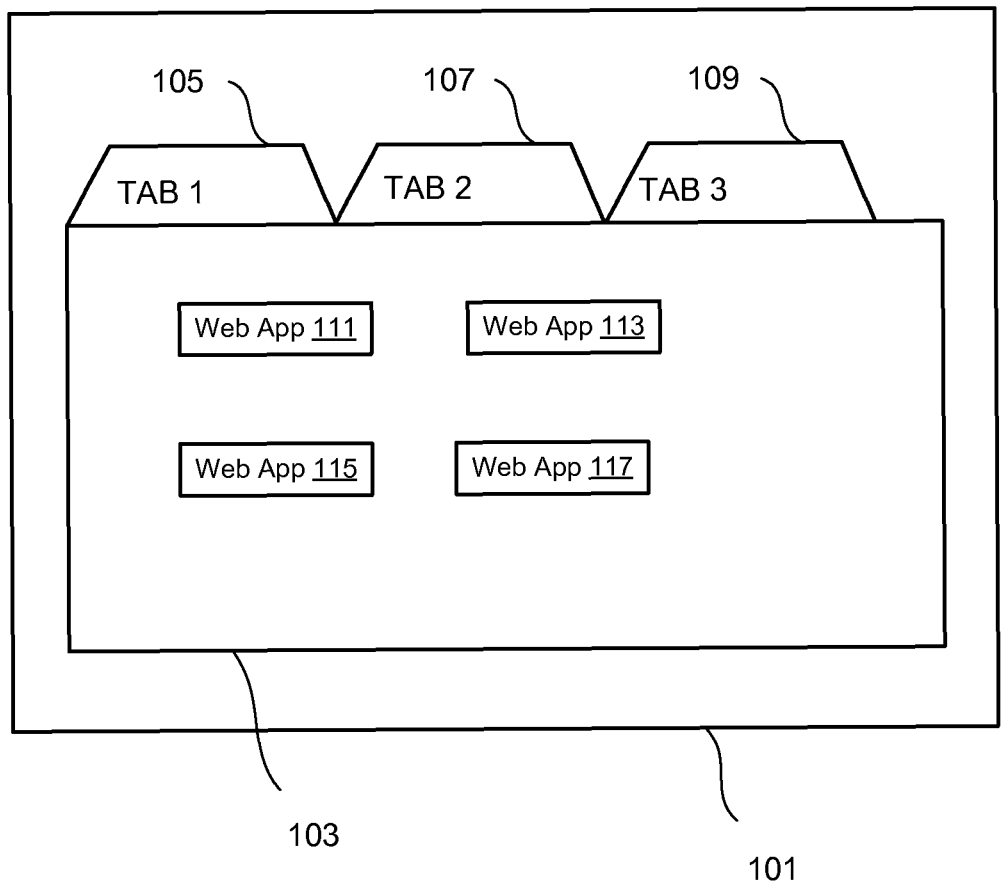
FIG. 1A is a block diagram of an example web browser.

FIG. 1A illustrates an example web browser application 101 that may display a user interface 103 including tabs 105, 107, and 109. In one implementation, tab 105 may display selectable icons for web applications 111, 113, 115, and 117. Systems and methods described here may be used for maintaining and providing a secure browser identity for a user may be implemented, for example, with web applications (e.g., web application 111) that maintain high scores on a game, and want to know who a user is when entering a high score. As another example, the described systems and methods may be used by shopping-related web applications (e.g., web application 113), to avoid requiring a user of web browser application 101 to login every time they go to purchase an item using the web application 113. As another example, an operator of a blog site can use the described systems and methods to uniquely identify people who post to the blog site. The blog site owner does not need to store username and passwords, which they do not like to do because if the blog site gets hacked those usernames and passwords may be used to break into other accounts, reflecting poorly on the blog site owner. As yet another example, a user's identity can also be used for website or web application 115 for email routing. The user's identity can be made somewhat anonymous, such that if a user wants to receive e-mail from a website but does not want the website to know the user's e-mail address, the described systems and methods allow the website to send e-mail to the user without the website knowing the user's actual e-mail address.

Another example use case, in addition to the blog site operator who does not want to be hacked, the shopping web site, etc., is that it is generally difficult to implement identity systems. Every developer for every web site has to do this over and over, and users hate creating accounts on every website over and over. Systems and methods described here save all of this energy and hassle, for both developers and users.

Instead of having one central identifier (ID) that a user logs into that is shared between servers, the user may have a per-application identity, and every web application (such as web applications 111, 113, 115, and 117) may have its own unique, pseudo-anonymous identity associated with it, such that there is no sharing between web applications. As such, a user does not have the same identity as determined by a username/password combination and associated with multiple different applications. That sort of username/password combination identify poses a problem because once one identity is compromised a hacker often has access to many different accounts of the user using the same username/password combination, because people often use the same password for e-mail as for many of their other finance or shopping websites. As yet another example, auto-filling capabilities of a browser may auto-populate a user's e-mail address, login, or password, but if one of the websites with such information gets hacked, a hacker may be able to utilize the same information on various sites. Methods and systems described here therefore provide extra security for user identities and user information online.

Further, methods and systems described here provide convenience for users while maintaining security for user identities online. For example, a user may include certain payment information in a user-specific identity cache of information that is stored on a client device, so that if the user chooses to subscribe to a monthly subscription for online television viewing using a trusted web application, the browser may automatically authorize the web application (with the user's consent) to charge the user's account a monthly subscription fee, via the browser, without requiring the user to re-enter complex payment information, for example into a complicated credit card authorization form or bank routing form.

A web browser, such as web browser application 101, executed by a client device can receive code (e.g., HTML code) from a remote server (e.g., a remote server that hosts a website) and can execute the receive code on the client device for the benefit of a user of the client device.

In various implementations, the web browser application 101 may include or be associated with one or more web applications (e.g., web applications 111, 113, 115, and 117). In this context, a "web application" may be configured to a single task or multiple tasks for a user. In such an embodiment, the web application may be configured to be executed or interpreted by the web browser. This is compared with the native applications that include machine executable code and are configured to be executed directly by a processor or via the operating system of the client device, whereas, a web application may be incapable of execution or display without the aid of the web browser. Thus, web applications can be run inside a browser with a dedicated user interface, and may provide functionality and an experience that is more rich and interactive than a standalone website but are less cumbersome and monolithic than a desktop application. Examples of web applications include games, photo editors, and video players that are run inside the browser.

Web applications can be "hosted applications" or "packaged applications." Hosted applications may include at least a portion of a web site that itself includes web pages, plus some metadata that may be especially pertinent to the web application or to the user of the web application to allow the web application to perform some particular functionality for the user. Packaged applications can be thought of as web applications whose code is bundled, so that the user can download all of the content of the web application for execution by the browser. A packaged web application may not need to have network access to perform its functionality for the user, and rather may be executed successfully by the browser locally on the computing device without access to a network. Packaged web applications have the option of using APIs, allowing packaged applications to change the way the browser behaves or looks.

In various implementations, the web browser may include or be configured to interact with one or more browser extensions. In this context, a "browser extension" may include one or more web pages packaged or grouped together as a definable whole, and configured to extend the functionality to the web browser. Thus, extensions also provide extra functionality to a browser, but generally, unlike applications, there is little or no user interface component to the functionality provided by an extension. Instead, web extensions extend the functionality of the browser and the websites being viewed in it. For example, web extensions can extend the functionality of the browser by adding a new button to the address bar, such as an ever-present currency converter. Buttons like this can also apply to the current website being viewed—for example, clicking the currency converter button can convert all prices on the website presented to a user into a currency chosen by the user. In another example, an extension can be installed so that when a user hovers a cursor over a thumbnail image on a webpage executed by a browser a larger-size version of the image is displayed until the user moves the cursor away from the image. In another example, and extension may be installed to embed a "mail this" button next to every link in every page. Compared to web applications, extensions cut across websites and web applications. Extensions are usually in effect across all websites (though some are site-specific). Web applications do not combine with other applications in this way. Rather, web applications run stand-alone, like any regular website.

Web browser extensions and applications can be downloaded for installation in and execution by a browser running on a client computing device. Web browser extensions and applications may require login information. When multiple extensions or applications are in use, a user may have a difficult time re-entering such login information or identity information for each web application. Systems and methods consistent with certain embodiments assist with providing user specific identity information to installed web applications (for example, using cryptographic key pairs), so that the user does not need to re-enter such information each time the user accesses the web application. When combined with sync capabilities, once the web application is installed and identified with the key pair, a user can log-in to a browser from any machine and utilize the web application without re-entering the credentials for the web application.

Figure 1B:
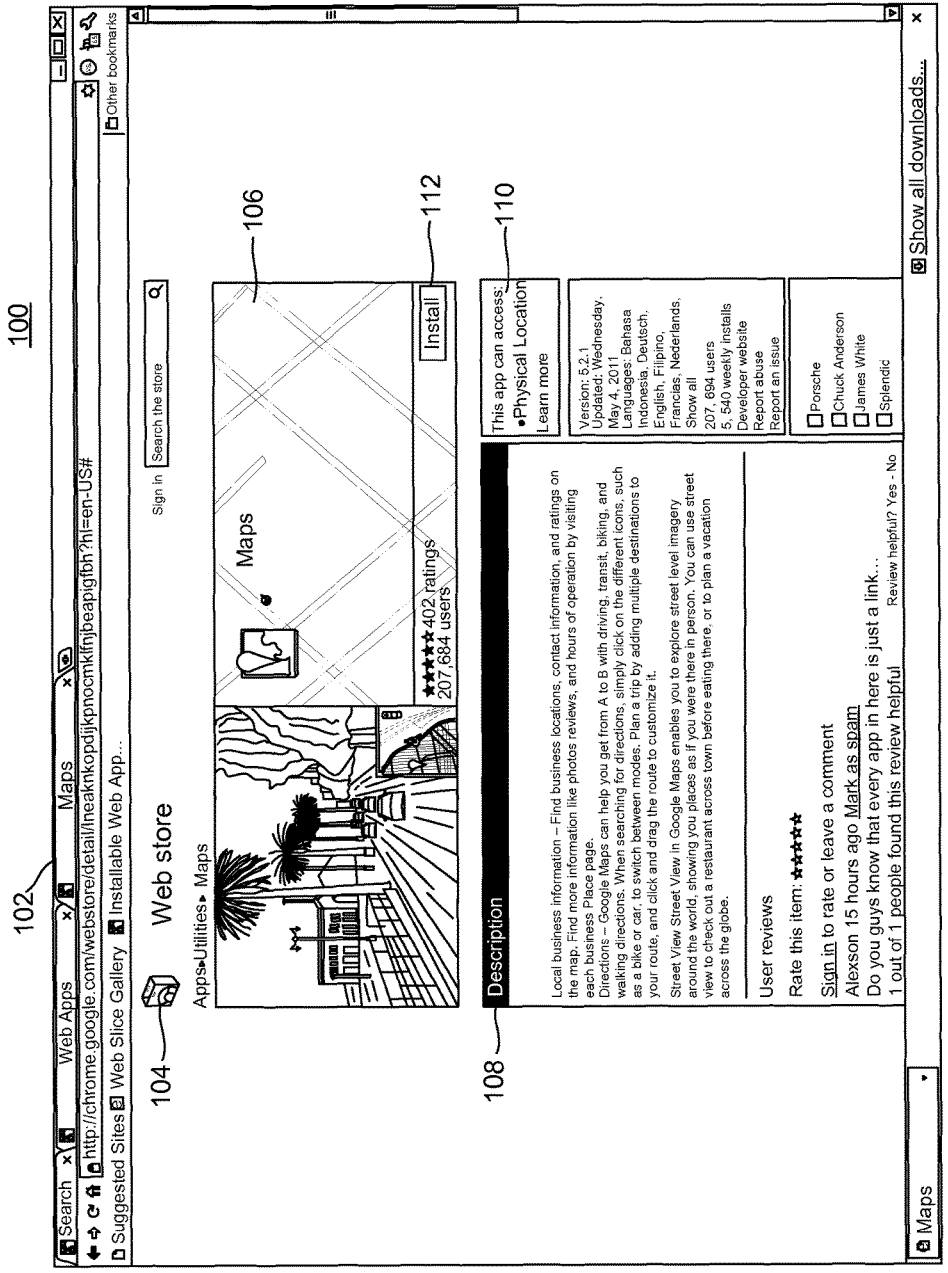
FIG. 1B is a diagram of a user interface that illustrates an example web application.

FIG. 1B is a user interface that illustrates an example web application. The web application is implemented in tab 102 of a web browser. In the example shown in FIG. 1B, a user has navigated the tab 102 of the web browser to a digital marketplace or web store. The digital marketplace or web store may be a location on the Internet accessible by the browser application from which a user can download applications, such as web applications and browser extensions that are integrated as part of the browser application.

In FIG. 1B, the user has navigated the tab 102 to a web store 104 and more specifically to page of the web store displaying information about a maps installable web application 106. In this example user interface 100, the browser application includes a description of the installable web application in a description field 108. The description field 108 may provide information regarding the functionality and capabilities of the particular web application. In one implementation, navigating the browser application to a specific web application within the marketplace may be considered a request to install the application in the browser on a device in which the browser application is running. For instance, the navigation by the user to the particular webpage illustrated in FIG. 1B may indicate a request to install the maps web application 106 in the browser application on a device on which this browser is running. However, in some implementations, the web application may not actually be installed until a confirmation is received from the user.

FIG. 1B also illustrates a notification field 110 that includes at least one permission that is associated with this web application. The notification field 110 identifies at least one permission, which indicates the declared permissions that may be used by the web application. In this example, the maps web application 106 indicates the declared permission that this particular application can access is the physical location of a user of the application. The notification field 110 provides explicit notification to a user of the permissions that this application may use upon installation in the browser application. By providing the permissions notification at the time of installation of the application, the user may either implicitly or explicitly grant approval for these permissions by choosing to proceed with the installation of the application. For example, a selection of an install button 112 indicates a confirmation to install the web application, where the confirmation includes granting the permission. Upon selection of the install button 112, the web application is installed in the browser application to include enabling the granted permission for use by the web application.

The permissions may be a declaration of the access that is desired by the web application or extension application to user-specific identity information (e.g., name, e-mail address, photo, avatar, location, age, payment information, etc.), device-side information, client-related information, or server-side information, such as information associated with a user or a device. While the above example illustrates a single permission, multiple permissions may be declared, and granted by the user as part of the installation process for the application. In this manner, developers of web applications and extension applications declare the desired permissions and associate the declared permissions as part of the web application. This informs the user about the access that is potentially being requested to specific information during the lifetime of the application while in use in the browser application of a client device controlled by the user.

In one exemplary implementation, the browser application 102 is configured to enforce the permissions associated with the application. In this manner, the browser application provides a mechanism to restrict or limit the application to only those permissions declared by the developer and granted at the time of installation. In this manner, access to browser application functionality and to client device-side information and other information may be limited to the declared permissions, which have been explicitly approved by the user at the time of installation.

In one exemplary implementation, a single declared permission may represent an aggregate of more than one permission. For example, a declared permission of "your physical location" means that the web application may access the device-side information related to a user's physical location including geolocation information. This also may represent a particular risk level and may be bundled with other location-related information in this one single permission. In this manner, a single permission that represents multiple similar types of declared permissions are bundled into a single group such that the user does not need to answer complex security questions that interrupt their normal workflow. The user may simply make an upfront assessment of trust that can later be revoked at any time. For example, if the user no longer desires to grant the permissions to the application, the user may simply uninstall the application. Other options may include selectively revoking individual permissions including permissions that represent an aggregate permission. If the user revokes permissions without uninstalling the application, some or all functionality of the application may be degraded. For example, if a user revokes permission for an application to access user-specific identity information such as an avatar, the web application may no longer display the user's avatar.

A webpage operating in a browser application may be required to ask for permission from the user before it can perform relatively innocuous tasks such as showing notifications, using the clipboard, or accessing permanent storage. Each time the webpage wants to perform one of these tasks, it may interrupt and prompt the user to grant permission. This may be annoying for the user and degrade the user experience for random webpages that are stumbled across each time access to the desktop or desktop notifications is requested. As discussed above, the installed web application or extension application in the browser application may grant all of the permissions needed or desired and declared by the application at the time of installation. The granted permissions can be stored, either locally or remotely, in association with the application and with the user that installed the application. Then, because the permissions have been stored, the user need not re-grant the permissions each time the user wishes to launch and run the web application.

Many different types of permissions may be declared by a developer as part of the application that is to be installed and executed within a browser running on a client device. For example, permissions may include permission for the web application to access a user's bookmarks, permission for the web application to access a user's web browsing history, permission for the web application to access or determine a user's geolocation, permission for the web application to access the URL's of, or information in, open tabs of the browser, permission for the web application to use unlimited local storage resources on the client device, permission for the web application to copy and paste information from the client device, permission to access local files on the client device executing the web application, permission to determine time when the web application is idle, permission for the web application to run native code on the client device, permission for the web application to run native code on the client device, permission for the web application to access or store a user's password information, permission for the web application to access local hardware of the client device. The hardware access permissions may include access to information and/or devices themselves including periphery access, power status, battery status, and other similar hardware device and related information access.

Other examples of declared permissions include context menus permissions, cookies permissions, and management permissions. A match pattern specifies a host permission. A match pattern may be used if the extension application or web application wants to interact with the code running on pages. Many extension capabilities, such as cross-origin XML HttpRequest, programmatically inject content scripts, and the cookies API require host permissions.

In some implementations, applications or extensions that interface with browser-related application programming interfaces (APIs) may use permissions that are needed by a specific API. For example, an API may require the use of access to the history of the browser application. If the history permission is declared and associated with the application, then after installation the web application may access the browser history without needing to request permission again and without further prompting to the user.

The bookmarks permission may be used if the web application or extension application uses the browser application bookmarks and bookmarks module, where bookmarks related to the browser application may be located. The geolocation permission may be used if the application or extension expects to use a geolocation API without prompting the user for permission. For example, the geolocation permission may be related to the proposed hyper-text markup language (HTML) 1 geolocation API. The notifications permissions may be related to the proposed HTML5 notification API without needing to use or request other permissions such as may be required by HTML5. The tabs permission may be used by an application or extension if other tabs or windows related to the browser application need to be accessed.

The unlimited storage web storage permission may be used by the web application or extension to provide an unlimited quota for storing client-side data, such as databases and local storage files. In this manner, any needed or desired storage space may be utilized by the web application. Without this permission granted, the application or extension may be limited to a specific size of local storage such as, for example, five megabytes of local storage.

The cross-origin XML HttpRequest permission may be used to enable a web application or an extension application to request access to remote servers outside of its origin. For example, cross-origin permission values may be fully qualified host names such as, for example, "http://www.google.com/" or "http://www.gmail.com/". In another example, the cross-origin permission values may be match patterns such as, for example, "code.google.com/chrome/ . . . /xhr.html" or "http://*.google.com!" or "http://*/". A match pattern of "http://*/" allows HTTP access to all reachable domains. If an application desires both secure and non-secure HTTP access to a given host or set of hosts, then those permissions may be declared separately in the manifest file.

In one exemplary implementation, the user interface 100 illustrated in FIG. 1 may be the only page presented to enable the user to confirm installation of the application and provide implicit allowance of the permissions listed in the notification field 110. In other implementations, selection of the install button 112 may prompt an additional confirmation and notification for the user to review and select.

Figure 2:
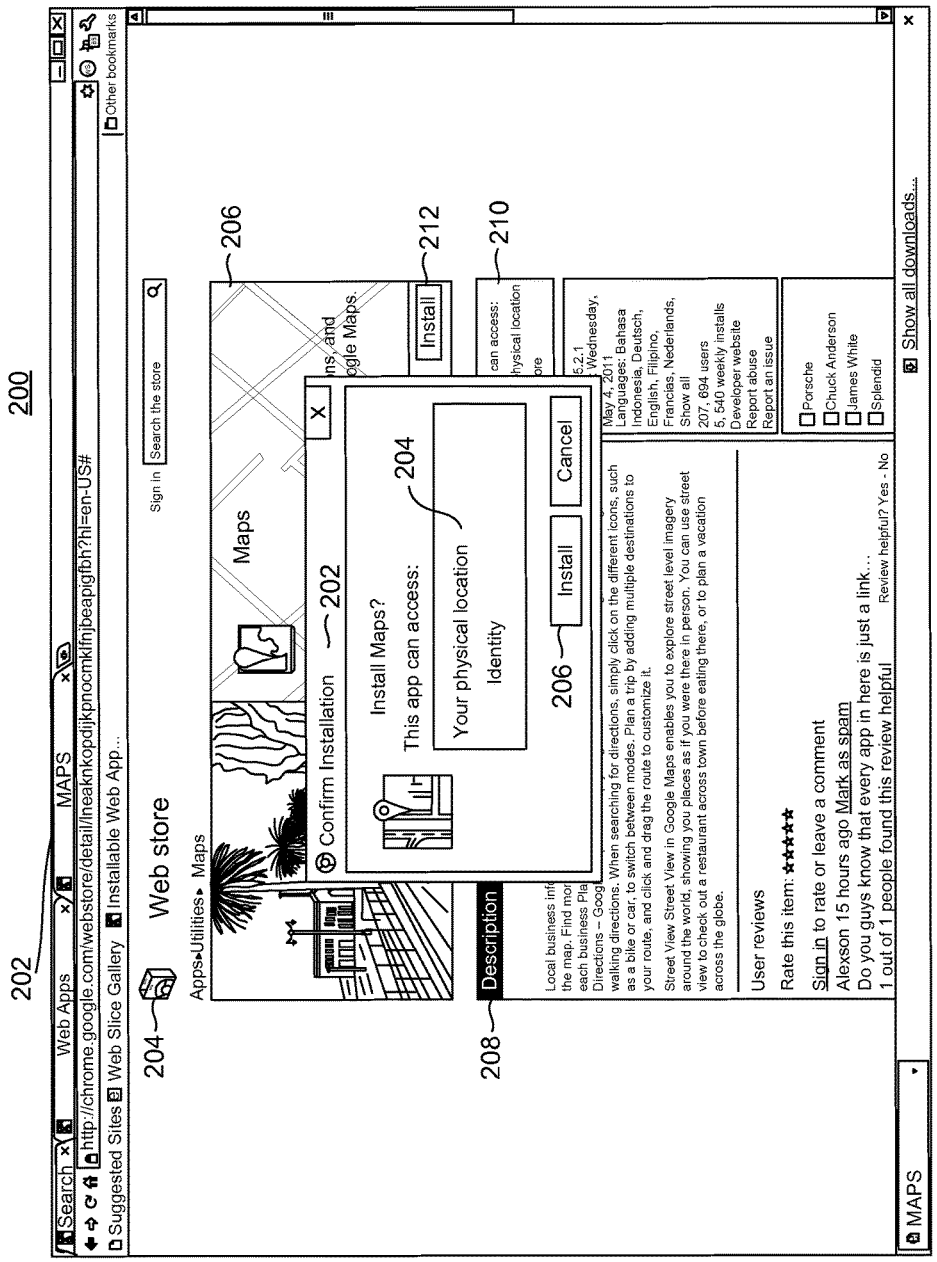
FIG. 2 is a diagram of a user interface that illustrates an example notification window related to a web application.

FIG. 2 is a diagram of a user interface that illustrates an example notification window related to a web application. As shown in user interface 200, notification window 202 may prompts the user to confirm installation of a desired web application. In this example, the user is prompted for a final confirmation to install the maps web application 106 in the browser application 102. The notification window 202 may include a permissions field 204, which lists the permissions requested and desired for use by the web application being installed. In this example, the notification window 202 includes more than one permission in the permissions field 204. For example, "your physical location" permission and "identity" permission are listed in the permissions field 204. The identity permission may include all user-specific identity information that a user has included in a browser identity profile, for example, (e.g., name, photo, age, location, avatar, e-mail address, payment information, etc.). In some implementations, however, other permissions may be used so that the access of a web application to an identity permission is only partial, for example based on an access control list (e.g., a "name identity" permission may be used to grant access only to a user login name, a "finance identity" permission may be used to grant access to a user credit card). In other implementations, an overall identity permission may be used to include any or all identity information that a user has included in a browser profile.

In some instances, the access to information may be re-labeled differently than listed by the name associated with an API that needs specific access. For example, the API may designate access to a geolocation permission, but the notification window may rephrase geolocation information to make it more user-friendly and understandable and rephrase it as "your physical location" to make it clear to the user that the application will access the physical location of the browser application and the device on which it is operating, which may be assumed to be with the user. In this manner, full disclosure is made to the user at the time of installation. Should the user desire not to allow access to this information, the user may simply cancel the installation and access to the permissions will be denied to the web application. In some implementations, users may selectively permit certain access while denying other access. For example, a user may allow a web application access to certain user-specific identity information (e.g., name, e-mail address), but not to others (age, location).

Upon receiving confirmation to install the web application, the web application may be installed in the browser application and the declared permissions may be enabled. For example, when a user selects the install button 206, confirmation to install the web application is received by the browser application 102, where the confirmation may include granting the permissions listed in the permissions field 204. The permissions field 204 may also include other information contained in metadata associated with the web application (e.g., reviews, ratings, a number of users that have downloaded the application, security issues, warnings, etc.).

FIG. 3 is an example of a manifest file related to a web application or extension. The manifest file 300 may include one or more fields that specify information related to the application. One of the fields may include a permissions field 302. In the permissions field 302, a developer specifies the declared permissions that may be used by the application. In this example, the declared permissions include unlimited storage permissions 304, notifications 306, and identity permission 308. If no permissions are declared, the permissions field may be omitted from the manifest file 300. In other examples, multiple permissions may be declared in the permissions field 302. The manifest file 300 is associated with the application and is part of the instructions that are loaded in the marketplace. The notification window 202 and/or the notification field 110, which lists the declared permissions, may read the manifest file 300 and the permissions field in order to populate these windows.

Developers of web applications may utilize the identity permission 308 to access, with the user's permission, certain identity information for a web application (such as a login user identifier, an avatar, or in some implementations, financial payment information such as a credit card number, or other user-specific information). By doing so, the web application developer may avoid requiring the user to re-enter credit card information or login information the first time, or each time, the user uses the web application. If a developer employs the identity permission 308 in a web application, the web browser may notify the user that the web application will have access to at least a portion of the user's identity information, for example as described above with respect to FIG. 1B and FIG. 2, such as when the user installs the web application.

To employ the identity permission 308, web application developers may employ a signature validation process, as described in more detail below with respect to FIGS. 5A and 5B. Client-side APIs, in conjunction with a secure mechanism such as signature validation, as described in FIG. 5B, may be used by web applications to get user identity details like a name, email, avatar, etc. For example, a web application may include an "identity" permission in a manifest file, as described in FIG. 3, and may make JAVASCRIPT API calls to access a user's identity information. In some implementations, HTTP response headers may be able to send these user identity details from a remote server, so long as the user has granted the web application appropriate permissions.

The user identity information may, in some implementations, be data associated with a user account for a web browser, a user account for an e-mail program, a user account for a calendar program, or a single sign-on system that may be utilized for a web browser, e-mail program, calendar program, set of web applications, etc.

In some instances, a developer of a web application may desire to add additional permissions in order to access other device-side information that was not originally declared at the time the application was installed. This may occur as part of an update to the web application or extension, and may be made available through the store in which the web application or extension was downloaded from through the browser application.

The browser application 102 may be configured to restrict one or more permissions associated with one or more installed web applications. For example, if a particular permission is deemed too risky or may provide access to malware, it can be made more limited and all existing extension applications and web applications may be automatically limited when the browser is updated. For example, after release if it is decided that access to a particular file was not useful or was too dangerous, then the permission may be changed to require that end users explicitly opt-in to enable the web application or extension application to use that feature.

In one exemplary implementation, optional permissions may be used by developers and declared in the manifest. This allows developers to list a set of permissions that are not necessarily required for normal usage of the web application. When the developer decides that it would like to use one of these permissions, it can prompt for it on demand, which will then add it to the list of permissions that the extension or web application is granted. This may result in the following additional benefits over some of the required permissions. For example, if an extension wants to use a more dangerous feature that is likely only useful to a small group of power users, they can make the permission optional thus not forcing all users to grant it access to a potentially dangerous capability that they might not trust. Optional permissions also may be listed in the manifest and flagged as such. The optional permissions may not appear in the notification windows at the time of installation, since they are optional. The optional permissions may only request access on demand following installation of the application at the time when access is requested. The user is given the option to grant or deny the optional permission at the time that it is requested. If the user denies permission, then the permission may not access the desired device-related information. If permission is granted by the user, then the extension or application may access the desired information. If more than one version exists of the web application or extension application, a developer can make use of a feature in one version and not in other versions. Optional permissions may be used to include features in one version that are not included in other versions. By listing it as an optional permission, the permission might only be presented to users of the browser that have the feature, thus allowing the developer to experiment with the new feature while not causing problems or breaking existing users.

In certain implementations, an extension can provide an identity service so that user-specific identity information can be stored in conjunction with the browser and then automatically provided to web applications that have permission to access the user-specific identity information. In this manner, a user may grant permission to a web application once to access such user-specific identity information and then may not need to manually provide, or authorize the provision of, such identity information when using the web application in the future. Thus, a user can store user-specific identity information and then allow the information to be used by certain web applications that have been granted permission to access the information but not allow the information to be used by other websites or web applications that do not have explicit permission to access the user-specific identity information. In this manner, the hybrid trust model of a web application can be utilized to the user's advantage, because the user may not want to share his user-specific identity information any random website that he visits, but may find it advantageous to be able to easily provide such information to web applications that are installed. In certain implementations, the user may provide such information to all web applications that are more trusted because they have been installed via a specific digital marketplace or web store (e.g., provided from a trusted company), have been used successfully and reviewed by other users, or have been verified to a certain degree by an operator of the web store.

Figure 4:
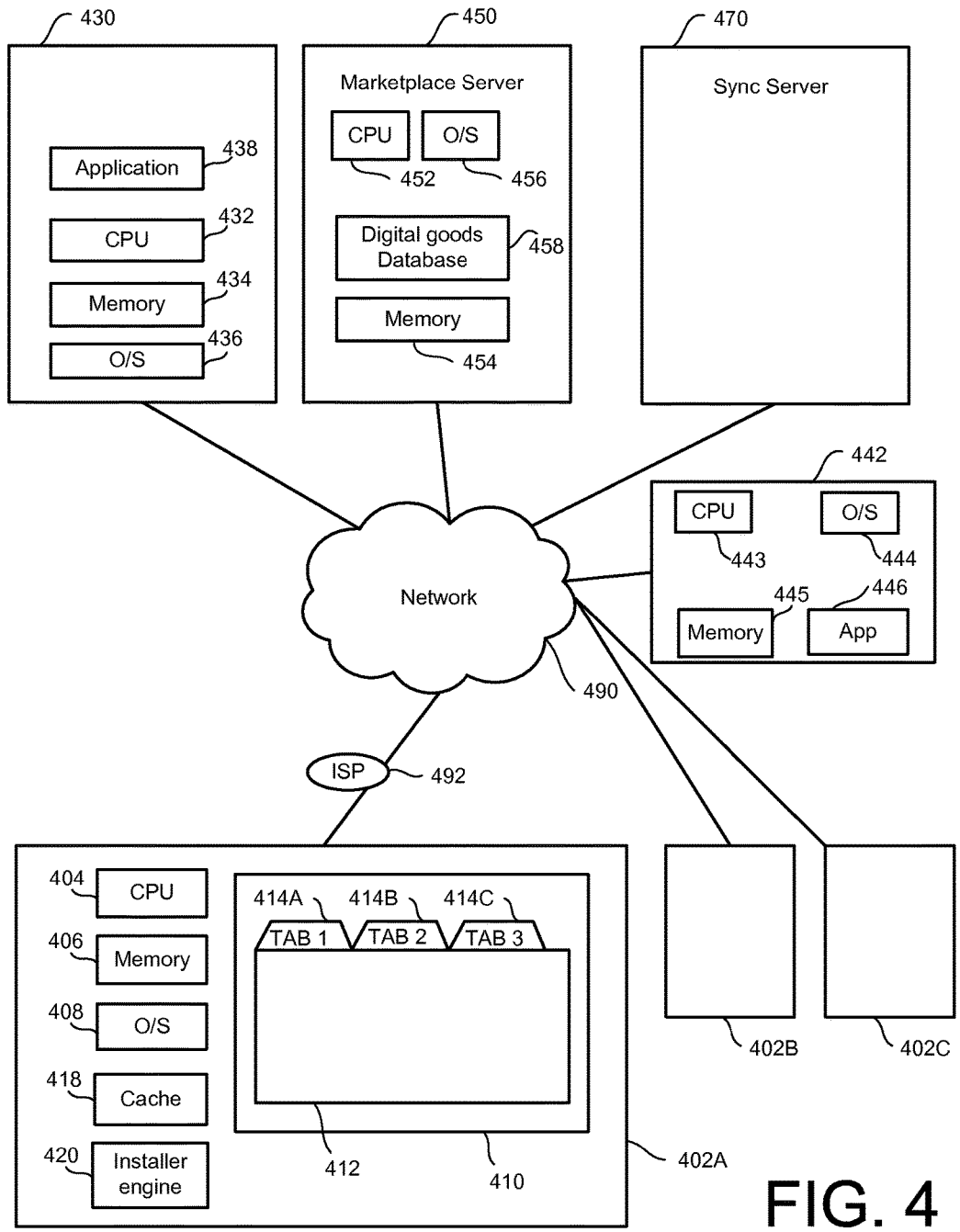
FIG. 4 is a schematic block diagram of an example of a browser identity system.

FIG. 4 is a schematic block diagram of an example of a browser identity system. Using system 400, user-specific identity information can be stored in association with a browser and conveyed to selected web applications that have permission to access the identity information so that the selected web applications can provide a user specific experience of the web application to the user. In various embodiments, the system 400 may include client computing devices (e.g., desktop computers, notebook computers, netbook computers, tablet computers, smart-phone, etc.) 402A, 402B, 402C. A client computing device 402A can include one or more processors 404 and one or more memories 406. The client computing device 402A can execute an operating system 408 and an application 410 that may display a user interface window 412. The client computing device 402A can include an installer engine 420 that can receive code for a web application that is to be run on the client device 402A from a server and can install the code on the client device so that the application can be executed by the device.

In one embodiment, the client computing device 402A may be running or causing the operating system 408 to execute an application 410 or window 412. For purposes of illustration the window 412 is referred to as a web browser. However, it is understood that the above is merely one illustrative example to which the disclosed subject matter is not limited. In various embodiments, this window 412 may include a plurality of panes or tabs 414A, 414B, 414C. The window 412 can be a visual area containing a user interface. In a graphical user interface (GUI) used in the client device 402A, the window 412 can be a two-dimensional object arranged on a plane of the GUI known as the desktop. The window 412 can include other graphical objects, e.g., a menu-bar, toolbars, controls, icons and usually a working area in which the document, image, folder contents or other main object can be displayed. The working area may be capable of holding only one main object (i.e., in a single document interface) or more than one main object in a multiple document interface. In some applications, specifically web browsers, multiple documents can be displayed in individual tabs 414A, 414B, and 414C. These tabs 414A, 414B, 414C may be displayed one at a time, and may be selectable via a tab-bar which often resides above the contents of an individual window. That is, one selected tab 414A is "forward-facing" and displays information or content to a user in the window 412, with the content of other tabs 414B, 414C is "hidden."

The client computing devices 402A, 402B, and 402C may receive online content from one or more server computing devices 430, 442, 450, and 470 that may be connected to the client device 402 through a network 490. Each of the client computing devices 402A, 402B, 402C can be connected to the network 490 through a local Internet Service Provider 492. The received online content can be processed and displayed in the window 412 (e.g., in a tab 414 of the window 412).

In some implementations, one or more of client computing devices 402A, 402B, 402C may be configured such that a web browser (such as application 410) operates as the operating system of the client device, and the client computing device may not include other applications. In such an implementation, the application 410 may operate as a tabbed window manager or shell for the web, rather than as a standard browser application. A tab (e.g., tab 414A) in the tabbed window manager may operate similar to a desktop application's title bar. A frame (e.g., such as window 412) containing the tabs may serve as a convenient mechanism for managing groups of applications. In some implementations, there may be other tab types that do not host a browser toolbar. The tabbed window manager user interface may use as little screen space as possible by combining web applications and standard web pages into a minimal tab strip. While existing operating systems may have web tabs and native applications in two separate strips, the tabbed window manager may combine these, giving access to everything from one strip.

The client computing device 402A can communicate with a web applications and extensions marketplace server 450 that provides a marketplace for web applications and extensions to client computing devices 402A, 402B, 402C. The marketplace server 450 can include one or more processors 452 and one or more memories 454. The marketplace server 450 can execute an operating system 456 and various applications and services to provide functionality to the client computing devices. For example, in one implementation, the marketplace server 450 can include a repository for database of web applications and extensions 458, and the web applications and extensions can be served from, or downloaded from, the repository to the client computing devices. In another implementation, the web applications and extensions can be stored in, and served to client computing devices from, a repository that is remotely located from the marketplace server. For example, web applications and extensions could be stored and served to client computing devices from individual repositories that are operated and controlled by developers of the web applications and extensions, and web applications and extensions repository 458 of the marketplace server 450 can provide just a reference to the individual repositories that are operated by the developers.

When the web application or extension, for example, a packaged web application that can be run offline (i.e., locally, with the client device 402A, without access to the network 490), is downloaded from the marketplace server 450 the client device 402A, the installer engine 420 can receive the downloaded web application or extension and install it for execution on the client device. For example, the installer engine can use browser extensions application programming interfaces (APIs) to integrate the web application with the browser, so that the web application can launch seamlessly within the browser application 410. Hosted web applications that can be run online, e.g., that are hosted by an online server that executes the application and serves content to the client device 402A through the network 490 for presentation to the user, also can be installed with the browser, by granting the hosted web application increased permissions to local resources on the client device. For example, installing the hosted application may include granting the hosted application permission to use unlimited local storage on the client device 402A or to access a user's browsing history, bookmarks, etc. that is stored on the client device 402A. Such permissions can be stored as part of the installation process for the hosted web application, so that the user need not re-grant these permissions each time the hosted web application is used.

The system 400 can include a developer client 442 with which a developer can develop applications or extensions or other web applications and extensions to be uploaded to the marketplace server 450 for presentation in the marketplace server. The developer client 442 can include one or more processors 443, one a more memories 445 for storing data such as, for example, executable instructions and/or content, an operating system 444, and one or more applications 446 they can be executed by a developer to perform various tasks such as, for example, developing web applications and extensions for presentation in the marketplace, receiving payments from the marketplace server 450, etc.

As shown in FIG. 4, the system 400 can include one or more servers 430 that may store and maintain user-specific information. Server(s) 430 can include one or more processors 432, one or more memories 434, an operating system 436, and one or more applications 438 that provide various services and/or functionalities to the user. In one implementation, the applications 438 can provide such services as an e-mail service, a calendar service, a blog hosting service, an online payment service, a content storage and management service (e.g., for storing and managing documents, photos, etc.). A user may access these various services by logging into a single account associated with the services. For example, a user may access the functionality of multiple applications by logging into a single account.

In some implementations, the user may access the various services by logging into multiple different accounts associated with the different services. For example, the user may log in to an account associated with the user's online e-mail account (e.g., Microsoft Hotmail, Yahoo mail, Google Gmail, etc.), the user's online social network account (e.g. Facebook, twitter, etc.), the user's online photo account (e.g., Snapfish, Shutterfly, Picasa, etc.), accounts at content websites (e.g., news websites game websites, entertainment websites, etc.), etc. Sync server 470 may ensure that local data from a computing device (e.g., device 402A, 402B, or 402C) is synced across all of a user's devices or all devices that are used to log the user into a user account. Additionally, passwords traditionally are stored locally, but can be synced across devices using sync server 470. Further, sync server 470 may sync across different devices all installed web applications, browser extensions, browser bookmarks, settings, profiles, browser history, themes, plugins, local permissions, user-specific identity information (as described in more detail below with respect to cache 418), and data associated with the web applications and browser extensions for a user. For example, if a user of computing device 402A accesses a user account (for example, via a web browser) from computing device 402B, sync server 470 may copy settings and data associated with web applications and browser extensions (for example, that the user has selected to sync) from the user account to computing device 402B. Changes to settings on one computing device may be automatically copied (e.g., via sync server 470) from other computers (for example, if the user has enabled that sync feature). Synced data may be encrypted when it travels between computing devices 402A, 402B, and sync server 470 to keep information secure and to ensure user privacy. Further, passwords may be encrypted on computing devices 402A, 402B, and sync server 470 using a cryptographic key.

The client computing device 402A also can include a cache of user-specific identity information in cache 418. The user-specific identity information can include information associated with a user of the browser application 210, for example, a name of the user, an e-mail address of the user, an avatar, an online alias used by the user, an age or birth date of the user, a mailing address of the user, a residential address of the user, a shipping address of the user, a phone number of the user, credit card information associated with the user, friends or contacts of the user, a history of websites browsed by the user, purchases and/or downloads made by the user (e.g., web applications and/or extensions available in the digital marketplace), etc. The user-specific identity information stored in the cache 418 can be stored on an opt-in basis by the user, and the user may control the particular information is stored in the cache 418.

The user-specific identity information stored in the cache 418 can be accessible to the browser 410, and the browser can provide the information to one or more web applications running in the browser when authorized by the user. The user specific identity information may be accessible to the browser 410 only when the user successfully provides login information to the browser. For example, the user may be required to enter a username and password to a user interface provided by the browser in order for the browser to access his or her identity information.

The cache 418 can be a volatile memory that stores user specific identity information during a browser session. The identity information can be permanently stored in a secure manner within a nonvolatile memory and then loaded into the cache 418 when the user successfully logs into the browser.

In another implementation, user-specific identity information can be permanently stored in a memory device (e.g. memory 434) of an online server 430. Then, when the user logs into an account associated with a service provided by the online server 430, the user-specific identity information can be downloaded from the online server 430 to the cache 418 of the client device 402A, for use by browser 410, with permission from a user. The identity information can be downloaded using secure encryption techniques to protect the information while it is being downloaded.

The browser 410 can be associated with user-specific identity information for different users or can be associated with different identity information for a single user. For example, different users may provide login information through a user interface provided by the browser, so that the browser to can retrieve and cache the different user-specific identity information for the different users. In another implementation, a single user may maintain different identity profiles having different identity information, which each are associated with different browser login accounts. Alternatively or additionally, various users of the same client device (e.g., a husband and wife using the same desktop computer) may create and maintain different identity profiles having different identity information, which each are associated with different browser login accounts.

A web application that a user downloads and installs within the client device 402A can include a permission that allows the web application to receive user-specific identity information from the browser that executes the application. Such a permission may be referred to herein as an "identity permission." Thus, when the user downloads and installs a web application that includes an identity permission the user may authorize the web application to receive user-specific identity information from the browser. The particular identity information that is provided by the browser to the web application may depend on the web application and the nature of the identity permission. In one implementation, a single identity permission may exist which pulls a collection of standard user-specific identity information (e.g., name and email address) from the client's browser 410. In another implementation, different levels of an identity permission may be specified, where the different levels correspond to different kinds or amounts of identity information that shall be pulled from the browser to the web application. For example, a "shopping" identity permission may request access to identity information such as the user's name, credit card information, billing address, shipping address, etc. In another example, a "user interests" identity permission may request access to identity information such as a user's browsing history, web application purchase history, content files (e.g., public blog postings), etc. in another example, a "social" identity permission may request access to identity information such as names of a user's friends in social networks, a user's contacts, a user's calendar information, etc. In another example, a "basic" identity permission may request access only to basic identity information such as the user's e-mail address.

As part of the installation process of the web application, a user may be requested to authorize an identity permission. The web application may request particular user-specific identity information as part of the identity permission, or, as described above, may be refer to the requested particular information by one or more generic markers, such as, for example, "shopping information," "user interest information," "social information," or "basic information." When the user grants the permission as part of the installation process, then the web application may be continuously granted the permission to access such information, unless or until the user revokes such permission. Then, each time the web application is launched within a browser application 410 when the user is logged into the browser 410, the web application can be automatically provided with the user specific identity information by the browser without the user having to take any steps to provide such information other than launching the web application. In this manner, the user may easily allow particular selected web applications to access and utilize the user's identity information without allowing other web applications or websites to access the user's identity information.

The web application can use the user-specific identity information in a variety of ways. For example, the web application may provide user-specific content to the user through the web application, where the user-specific content is based on the user's-specific identity information that is provided by the browser to the web application. The user-specific content can be content that is specially selected based on the user's interests, demographics, location, or other such user-specific identity information.

In a specific example, the user may download and install a web application for Marvel Comics, so that the user can access and read content provided by Marvel Comics. As part of the installation of the web application, identity information associated with the user can be requested. For example, the web application may request to know the user's e-mail address, and browsing history. After granting such permission and launching the web application, the web application can make use of the identity information to provide user specific content to the user.

For example, the web application may compare the user's e-mail address to e-mail addresses listed in other databases associated with Marvel Comics, which may indicate that the user previously registered an account with Marvel Comics (e.g., at a website associated with the domain www.marvel.com) and that the user had previously browsed, viewed, downloaded, or purchased certain content from Marvel Comics. Then, the web application may automatically associate the user of the web application with the profile of the user with the same e-mail address that previously browsed, viewed, downloaded, or purchased the content from Marvel Comics, and therefore can suggest or provide content through the web application to the user based on the user's previous interaction with other properties associated with Marvel Comics. In another implementation, the web application may retrieve and parse the user's browsing history to determine interests of the user and then may provide or suggest content available through the web application, which is based on the user's determined interests. For example, the suggested content may include romantic comics for a user whose browsing history indicates an interest in romantic topics, and the suggested content may include adventure comics for a user is browsing history indicates an interest in adventure topics.

The browser 410 can be shared by multiple users, and each user may have different user-specific identity information. Thus, when different users login to the browser 410 and launch the Marvel Comics web application within the browser, the application may provide different user-specific content to each of the different users based on the identity information pulled by the web application from the browser for each of the different users. The web application may pull the user-specific identity information, for example by making an API call to the browser, to pull information from the cache 418.

Granting of identity permission to web applications that are installed within a browser can provide a better user experience for a user when multiple web applications are installed in a browser for a user. As described in more detail below with respect to FIGS. 5A and 5B, during the installation of each web application, the user can authorize the use of specified user-specific identity information by the web application, and as different web applications are launched and used, pertinent identity information can be automatically pulled by each web application from the browser, without the user having to take any additional steps (e.g., login, enter passwords, etc.) other than launching the web application.

The information that is provided by an application 410 running on a client device to the marketplace server 450 (e.g., regarding a user's browsing history, etc.) can be provided on an opt-in basis. In other words, such information may be provided from the client computing device 402A to the server 450 only if the user of the client device specifically authorizes the transmission of such information from the client to the server.

Figure 5A:
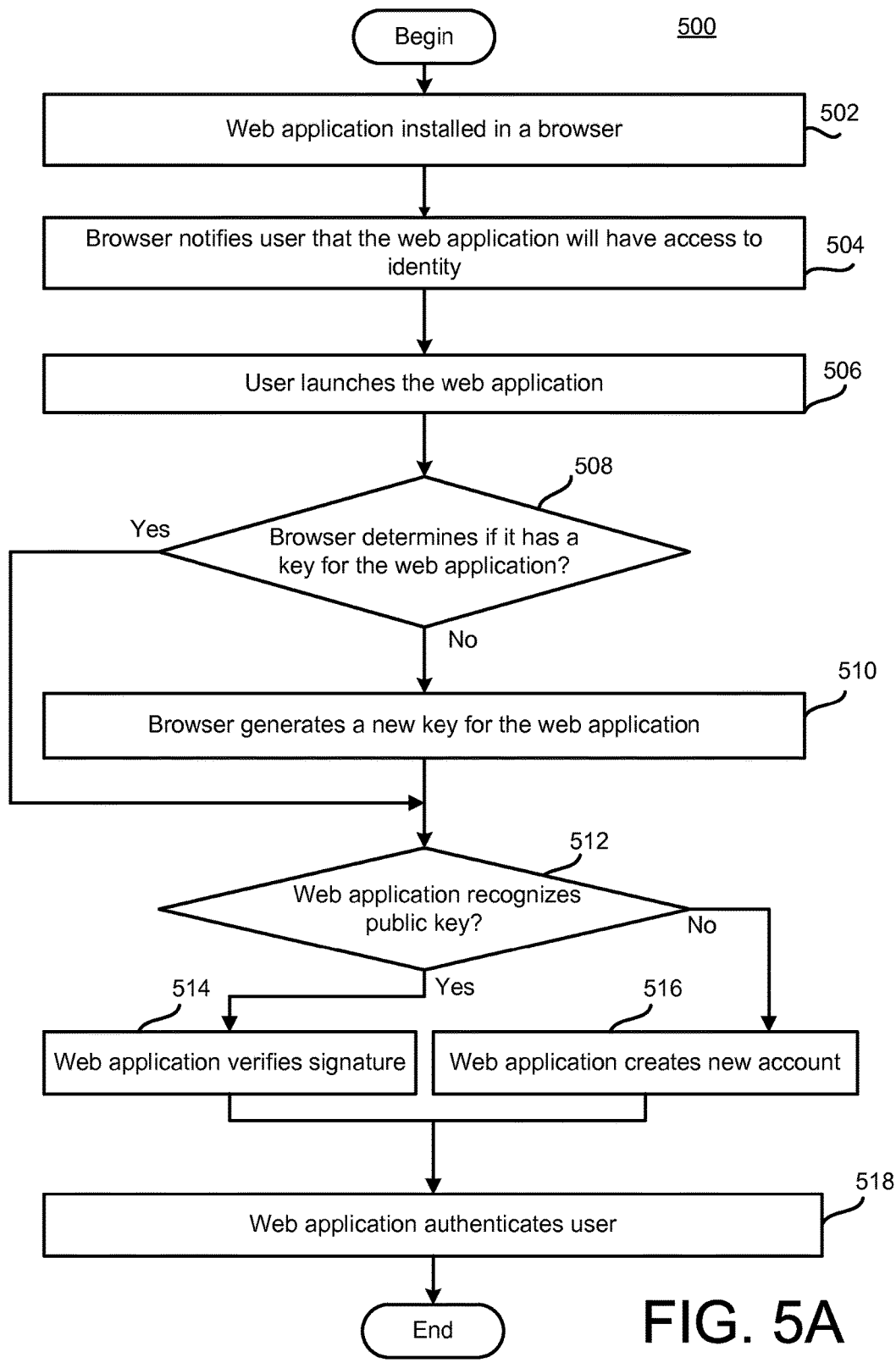
FIG. 5A is a flow diagram of an example process for utilizing a browser identity, in accordance with implementations described with respect to FIGS. 1-4.

FIG. 5A illustrates a flow diagram of an example process 500 for utilizing a browser identity, in accordance with implementations described above with respect to FIGS. 1-4. Process 500 may begin when a user installs a web application in a browser (502), such as browser 410 as shown in FIG. 4. In some implementations, prior to 502, a web application may declare that it requires identity information.

The browser notifies the user that the web application may have access to the user's identity or identity information (504), for example using a notification window such as notification window 202 shown in FIG. 2. When the user launches the web application (506), the browser determines if it has a key for the web application (508). If yes, (508, yes), the process continues to 512. If not (508, no), the browser may generate a new key pair for the web application (510). The browser may generate the key pair (e.g., a public and private key), for example using asymmetric key algorithm technology to create a public encryption key and a private encryption key. The browser may generate the key pair within the browser and store the private key in association with the browser, such that no web application, website, or other application can access the private key.

The browser may send the public key to the web application with a signature provided by the private key (such as "X-Chrome-User: <pubkey>: <signature(cookies)>"), and the web application determines if it recognizes the public key (512). If the web application recognizes the public key (512, yes), the web application verifies the signature using the public key (514).

Such a signature validation process may be useful for developers to incorporate into web applications. Further, developers do not need to create additional prompts for a user authentication.

If the web application does not recognize the public key (512, no) the web application may create a new account for the user (516), for example using an automatic prompt such as a pop-up window. Next, the web application may authenticate the user (518), and the process may end. In some implementations, after 518 for example, the web application may request and display additional identity information such as name, photo, etc.

After process 500 allows a web application to authenticate a user via the browser identity, the web application may display details like a name, avatar, photo, email address, or other user-specific identity information, for example by querying an object of a client-side browser API. In some implementations, the web application can protect against replay attacks by including a timestamp in a cookie. The browser may also control an authentication user interface, in order to improve a user's experience.

The private key cannot be leaked because it never leaves the browser, thus providing security for user identities online. Moreover, the methods and systems described here also work nicely for offline web applications.

Figure 5B:
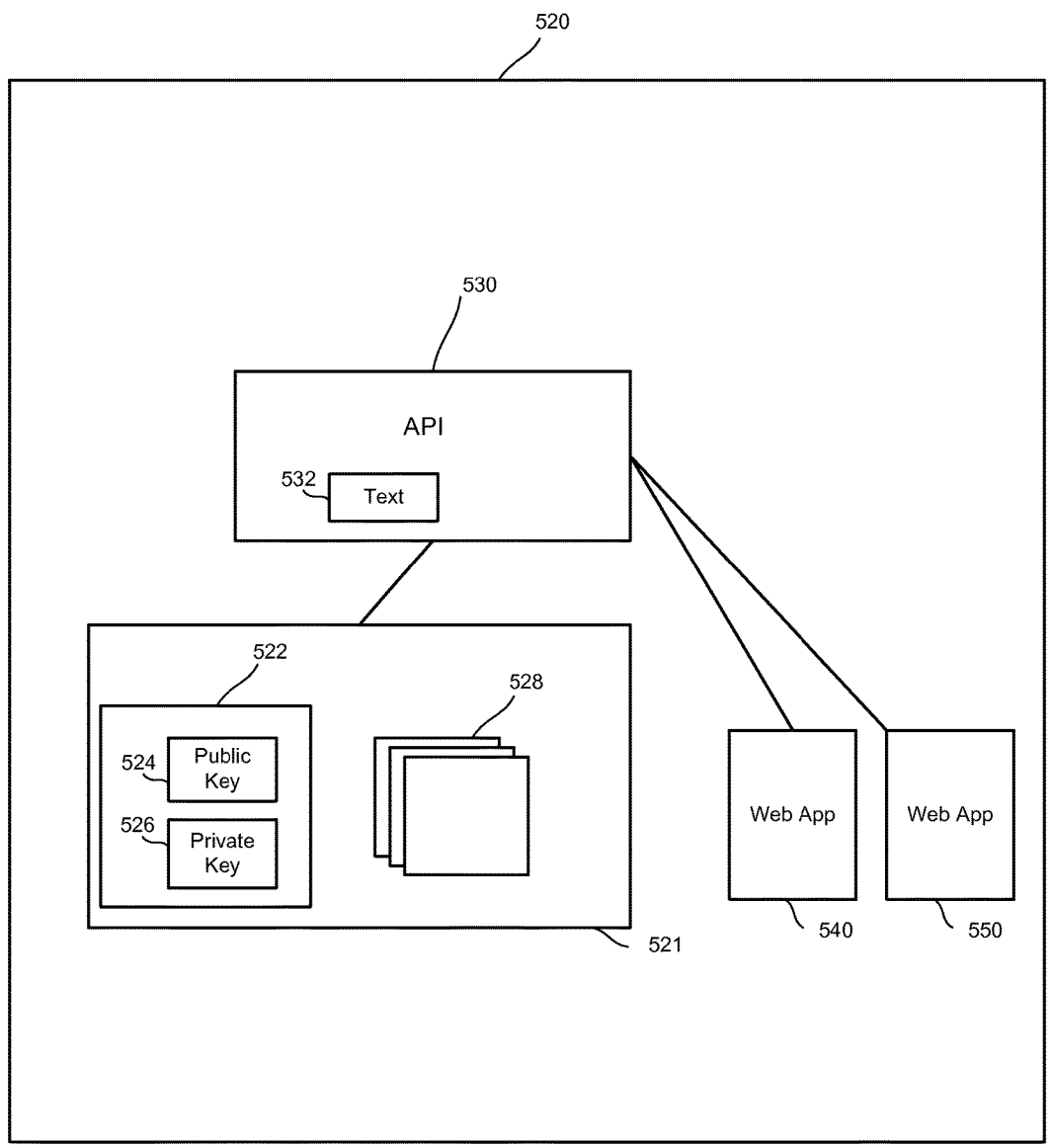
FIG. 5B is a block diagram of an example of a cryptographic exchange of information between a browser and a web application.

FIG. 5B is a block diagram of an example of a cryptographic exchange of information between a browser and a web application. FIG. 5B includes browser 520, which includes cryptographic key generator 521, browser API 530, and web applications 540 and 550. Cryptographic key generator 521 generates a key pair 522 including a public key 524 and a private key 524, which may be associated with a particular user of browser 520. Multiple users may be associated with browser 520, but generally only one user may login to the browser 520 at a time. The private key 526 never leaves the browser 520 and is not provided to the web applications 540 or 550 or to other websites, thus providing security for user identities online. A message encrypted with the user's public key 524, however, may be provided to web applications 540 and 550 or to other websites, with the user's consent, thus eliminating the need for the user to re-enter personal identity information (e.g., name, login, or even financial information) each time the user wishes to access a different web application using browser 520.

Browser 520 may also store at least one public key 528 that is associated with a particular website or web application. For example, public key 528 may be a public key for web application 540, which is installed in browser 520.

If a website or web application 540 wants to verify the identity of a particular user, web application 540 may challenge the browser 520 to verify the user's identity, for example using API 530. For example, web application 540 may use a user's public key that has been previously provided by browser 520, to encrypt a specific message, such as text 532. The web application 540 may challenge the browser 520 to decrypt the message to find text 532. If the browser 520 can decrypt the message to find text 532, (e.g., using the private key 526), browser 520 may prove to the web application 540 that the browser has the private key 526 for the particular user. Communication between the web application 540 and the browser 520 may be done through a browser API 530 or through other techniques.

Figure 6:
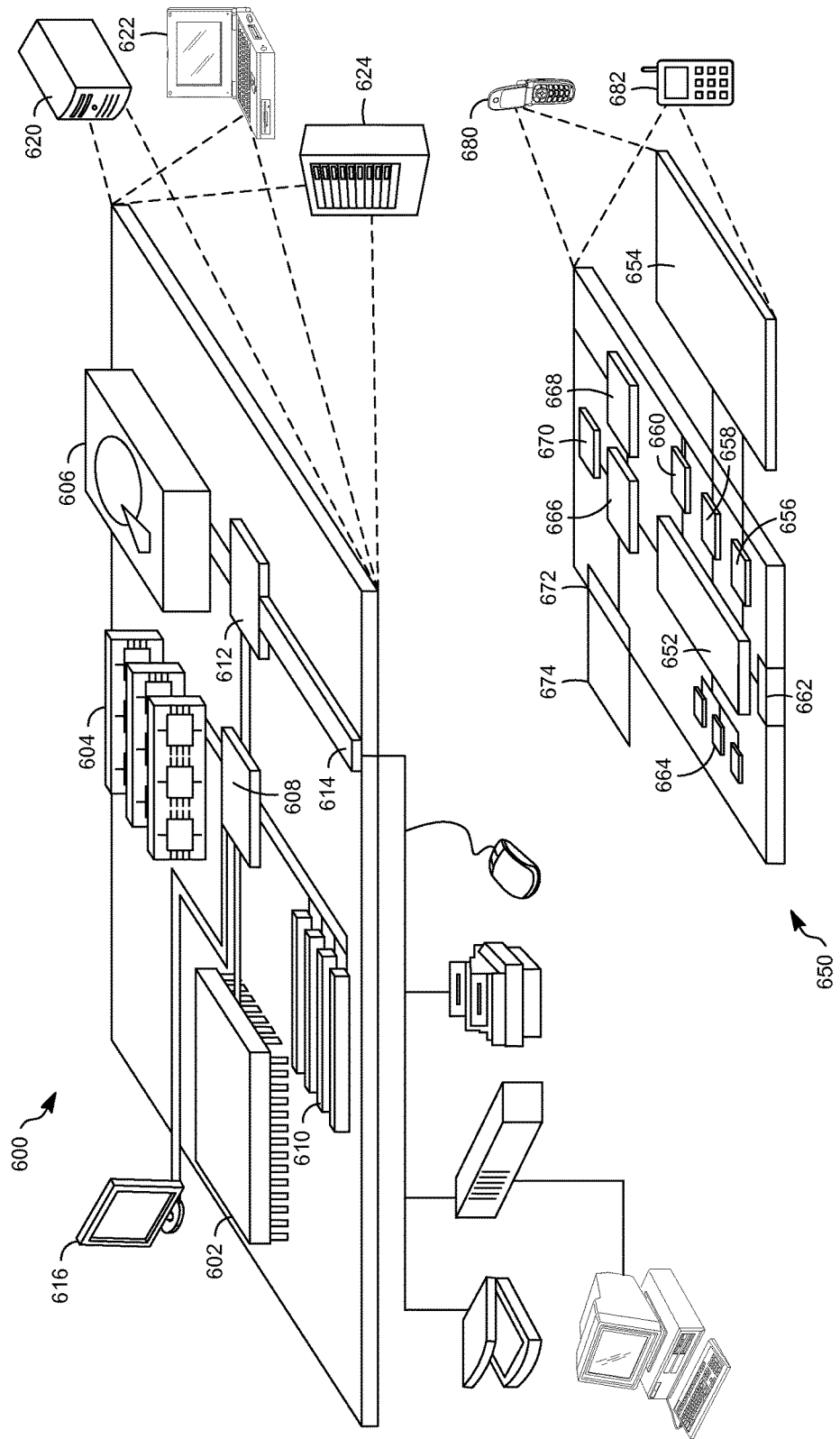
FIG. 6 shows an example of a computer device and a mobile computer device that can be used to implement the techniques described here.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
executing a browser at a client device;
receiving, at the browser, browser login information from a user;
in response to receiving the browser login information, logging the user into a browser login account associated with the browser executing on the client device;
in response to logging the user into the browser login account, receiving user-specific identity information from a server on behalf of the user;
storing, by the browser at the client device, the user-specific identity information;
installing a web application for execution by the browser, wherein installation of the web application grants, to the web application, permission to access the user-specific identity information provided to the browser and stored at the client device;
exposing, within the browser, an application programming interface (API) of the browser to the web application executing in the browser;
transmitting, within the browser and via the API of the browser, cryptographic information associated with the user to the web application, the web application verifying an identity of the user based on the cryptographic information; and
providing, based on the user-specific information provided to the browser and stored at the client device, user-specific content to the user through the web application after the web application verifies the identity of the user from the cryptographic information provided via the API of the browser.

2. The method of claim 1, wherein the cryptographic information includes a unique message and a public key associated with the user.

3. The method of claim 2, wherein the unique message is not shared with other web applications that are executed by the browser.

4. The method of claim 1, wherein the user-specific identity information includes a user name and email address.

5. The method of claim 1, wherein the server stores the user-specific identity information and is remote from the client device executing the browser, and wherein the user-specific identity information is provided to the browser upon the user logging into an account.

6. The method of claim 1, further comprising:
providing login information for the user, including a username, to an online account associated with the user from a first client device;
associating the user's installation of the web application with the online account;
providing login information for the user, including the username, to the online account associated with the user from a second client device controlled by the user;
upon providing the login information, automatically installing the web application within a browser executing on the second client device, wherein installing the web application includes granting permission to the web application to access the user-specific identity information, wherein the user-specific identity information is stored, at the second client device, by the browser executing on the second client device;
launching the web application in the browser executing on the second client device;
automatically providing at least a portion of the user-specific identity information from the browser executing on the second client device to the web application based on the user's launching of the web application; and
providing user-specific content to the user through the web application launched in the browser executing on the second client device, wherein the user-specific content is based on the portion of the user-specific identity information that is provided to the web application.

7. The method of claim 1, further comprising:
upon approval by the user, receiving a request, within the browser, from the web application for stored user-specific identity information via an API call from the web application to the browser.

8. The method of claim 1, wherein the web application includes a manifest file and at least a portion of a web site.

9. The method of claim 8, wherein the web application was packaged as an installable entity.

10. The method of claim 9, wherein the web application is self contained and operates offline.

11. The method of claim 1, wherein the cryptographic information persists within the browser after the user logs out of another web application or another website while using the browser.

12. The method of claim 1, further comprising:
upon installation of the web application within the browser, automatically providing a pop-up window to notify the user that the web application will have access to at least a portion of the user-specific identity information.

13. The method of claim 1, wherein the user-specific identity information includes account information.

14. The method of claim 13, wherein the account information includes private identifiers for multiple credit cards.

15. The method of claim 1, wherein the browser operates as an operating system of the client device.

16. A non-transitory computer readable medium containing instructions executable by a processor of a computing device, that when executed by the processor cause the computing device to:
execute a browser;
receive, at the browser, browser login information from a user;
in response to receiving the browser login information, log the user into a browser login account associated with the browser;
in response to logging the user into the browser login account, receive user-specific identity information from a computer different from the computing device on behalf of the user;
store, by the browser at the computing device, the user-specific identity information;
install a web application for execution by the browser, wherein installation of the web application grants, to the web application, permission to access the user-specific identity information provided to the browser and stored at the computing device;
expose, within the browser, an application programming interface (API) of the browser to the web application executing in the browser;
transmit, within the browser and via the API of the browser, cryptographic information associated with the user to the web application, the web application verifying an identity of the user based on the cryptographic information; and provide, based on the user-specific information provided to the browser and stored at the computing device, user-specific content to the user through the web application after the web application verifies the identity of the user from the cryptographic information provided via the API of the browser.

17. A system including:
a memory; and
a processor operably coupled to the memory and configured to execute code to:
   execute a browser;
   receive, at the browser, browser login information from a user;
   in response to receiving the browser login information, log the user into a browser login account associated with the browser;
   in response to logging the user into the browser login account, receive user-specific identity information from a computer different from the system on behalf of the user;
   store, by the browser at the system, the user-specific identity information;
   install a web application within the browser, wherein the installation grants, to the web application, permission to access the user-specific identity information provided to the browser and stored at the system;
   expose, within the browser, an application programming interface (API) of the browser to the web application executing in the browser;
   transmit, within the browser and via the API of the browser, cryptographic information associated with the user to the web application, the web application verifying an identity of the user based on the cryptographic information; and
   provide, based on the user-specific information provided to the browser and stored at the system, user-specific content to the user through the web application after the web application verifies the identity of the user from the cryptographic information provided via the API of the browser.

* * * * *

UNITED STATES PATENT AND TRADEMARK OFFICE
CERTIFICATE OF CORRECTION

| | |
|---|---|
| PATENT NO. | : 9,887,965 B2 |
| APPLICATION NO. | : 13/554492 |
| DATED | : February 6, 2018 |
| INVENTOR(S) | : Kay et al. |

Page 1 of 1

It is certified that error appears in the above-identified patent and that said Letters Patent is hereby corrected as shown below:

On the Title Page

Column 2, Item (57), in "ABSTRACT", Line 2, delete "verify an identify" and insert -- verify an identity --, therefor.

Column 2, Item (57), in "ABSTRACT", Line 8, delete "verifies an identify" and insert -- verifies an identity --, therefor.

Signed and Sealed this
Fifth Day of June, 2018

Andrei Iancu
*Director of the United States Patent and Trademark Office*